US 12,437,290 B2

United States Patent
Vosseller et al.

(10) Patent No.: US 12,437,290 B2
(45) Date of Patent: Oct. 7, 2025

(54) DIGITAL CONTENT CONTROL BASED ON NONFUNGIBLE TOKENS

(71) Applicant: eBay Inc., San Jose, CA (US)

(72) Inventors: Shannon Bruce Vosseller, Zurich (CH); Christopher Michael Matthews, Pacifica, CA (US)

(73) Assignee: eBay Inc., San Jose, CA (US)

( * ) Notice: Subject to any disclaimer, the term of this patent is extended or adjusted under 35 U.S.C. 154(b) by 429 days.

(21) Appl. No.: 17/492,398

(22) Filed: Oct. 1, 2021

(65) Prior Publication Data

US 2023/0108983 A1 Apr. 6, 2023

(51) Int. Cl.
*G06Q 20/38* (2012.01)
*H04L 9/32* (2006.01)
*H04L 9/00* (2022.01)

(52) U.S. Cl.
CPC ..... *G06Q 20/38215* (2013.01); *G06Q 20/389* (2013.01); *H04L 9/3213* (2013.01); *G06Q 2220/00* (2013.01); *H04L 9/50* (2022.05); *H04L 2209/603* (2013.01)

(58) Field of Classification Search
CPC ............... G06Q 20/00–425; H04L 9/00–50
See application file for complete search history.

(56) References Cited

U.S. PATENT DOCUMENTS

| | | | |
|---|---|---|---|
| 10,505,726 B1* | 12/2019 | Andon | H04L 9/0643 |
| 2005/0033655 A1 | 2/2005 | Woolston | |
| 2019/0220836 A1* | 7/2019 | Caldwell | H04L 9/50 |
| 2020/0005284 A1* | 1/2020 | Vijayan | G06Q 20/065 |
| 2020/0027145 A1 | 1/2020 | Tuli et al. | |
| 2020/0074461 A1 | 3/2020 | Derosa-Grund | |
| 2020/0110728 A1 | 4/2020 | Semenov et al. | |
| 2020/0242105 A1* | 7/2020 | Rich | H04L 9/40 |
| 2020/0273048 A1* | 8/2020 | Andon | G06Q 10/02 |
| 2021/0035246 A1 | 2/2021 | Schouppe et al. | |
| 2022/0329446 A1 | 10/2022 | Jackson et al. | |
| 2023/0009908 A1 | 1/2023 | Castinado et al. | |
| 2023/0062776 A1 | 3/2023 | Vosseller et al. | |
| 2023/0126386 A1 | 4/2023 | Kurian | |

OTHER PUBLICATIONS

Tech Blog, Retrieved from the Internet URL :<https://tech.ebayinc.com/>, Accessed on May 7, 2020, 8 pages.
U.S. Appl. No. 17/411,852, "Restriction Requirement", U.S. Appl. No. 17/411,852, Sep. 6, 2023, 6 pages.

(Continued)

*Primary Examiner* — Ari Shahabi
(74) *Attorney, Agent, or Firm* — FIG. 1 Patents

(57) ABSTRACT

Techniques are described, as implemented by computing devices, to provide digital content to users through use of nonfungible tokens (NFTs). This is performed by leveraging a blockchain such that digital content associated with an item is made available to encourage the user to interact with NFTs on the service provider platform (e.g., discounts, NFT listing functionality, automatic initiation of NFT transfers, and so forth) based on a user's possession of the NFT.

17 Claims, 14 Drawing Sheets

(56) References Cited

OTHER PUBLICATIONS

Chirtoaca, Dan, et al., "A Framework for Creating Deployable Smart Contracts for Non-fungible Tokens on the Ethereum Blockchain", 2020 IEEE International Conference on Decentralized Applications and Infrastructures (DAPPS) [retrieved Jan. 26, 2023]. Retrieved from the Internet <https://doi.org/10.1109/DAPPS49028.2020.00012>, Jul. 8, 2020, 6 pages.
EP22191596.0, "Extended European Search Report", EP Application No. EP22191596.0, Jan. 25, 2023, 7 pages.
U.S. Appl. No. 17/411,852, "Non-Final Office Action", U.S. Appl. No. 17/411,852, Feb. 20, 2024, 27 pages.
U.S. Appl. No. 17/411,852, "Final Office Action", U.S. Appl. No. 17/411,852, Jun. 18, 2024, 33 pages.
Jackson, Kevin L, et al., "US Application as Filed", U.S. Appl. No. 17/712,908, filed Apr. 4, 2022, 55 pages.
Jackson, Kevin L, et al., "US Provisional Application as Filed", U.S. Appl. No. 63/172,066, filed Apr. 7, 2021, 14 pages.
U.S. Appl. No. 17/411,852, "Non-Final Office Action", U.S. Appl. No. 17/411,852, filed Sep. 30, 2024, 22 pages.
"Final Office Action", U.S. Appl. No. 17/411,852, filed Apr. 11, 2025, 23 pages.

* cited by examiner

DIGITAL CONTENT CONTROL BASED ON NONFUNGIBLE TOKENS

BACKGROUND

Service provider systems maintain millions of service provider accounts for millions of users that are accessible via a network using various types of computing devices. Additionally, these service provider systems are tasked with providing ever increasing amounts of digital content in support of numerous digital services that are made accessible to users of these service provider accounts. To support this, service provider systems consume vast amounts of computational resources. These computational resources are implemented using multiple servers, network connection devices, and so on that require significant amounts of energy to operate. As a result, inefficiencies in the maintenance of the accounts as well as digital content and digital services made available by these systems can lead to major costs incurred by both the service provider system and the environment.

Inefficiencies in the use of computational resources can come in many forms, such as by providing erroneous digital content. Service provider systems, for instance, often rely on outdated data. Consequently, the digital content provided is irrelevant to a first user, but in some instances is relevant to a second user that did not receive the digital content. Thus, computational resources are wasted on providing the first user the irrelevant digital content erroneously. Additionally, sending a user a large amount of irrelevant digital content can result in undesired consequences to the service provider system, such as a decrease in user interaction with subsequent digital content and a decrease in user satisfaction with the service provider system.

SUMMARY

Techniques are described, as implemented by computing devices, to control digital content output based on nonfungible tokens (NFTs). This is performed by leveraging a blockchain such that control of digital content by a computing device is based on an entity's possession of an NFT.

In one example, data related to an NFT is obtained by a service provider system. The data is obtained, for instance, from a user input identifying the NFT. This data is used to generate a blockchain query to determine what blockchain account holds the NFT. Data from the blockchain query can be leveraged to determine if there is a service provider account related to the blockchain account that holds the NFT. In instances where a related service provider account is determined, digital content is exposed to that service provider account. The described blockchain queries are leveraged to prevent delivery of irrelevant digital content to be offered to or accessed by a user that does not hold the NFT, such as a previous holder of the NFT. This prevention results in increased efficiency of computer resources used to control digital content output.

In a further example, blockchain query data, service provider account data, and user input data are leveraged to generate digital content. The digital content is generated for the service provider account once a query is performed to determine that the blockchain account related to the service provider account is in possession of the NFT. Once the digital content is generated, the service provider system exposes the digital content to the related service provider account. After exposure to the digital content, the digital content may be accessed once possession of the NFT is verified. In one such example, this verification involves user input of blockchain keys. The digital content includes functionality that encourages the user to interact with NFTs on the service provider platform, e.g., discounts, NFT listing functionality, automatic initiation of NFT transfers, and so forth. This digital content can be specific to the NFT, specific to the user, or specific to both.

In this way, the techniques described herein to control generation and exposure of digital content to the relevant user in a manner that is computationally efficient and promotes user satisfaction with the service provider system.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
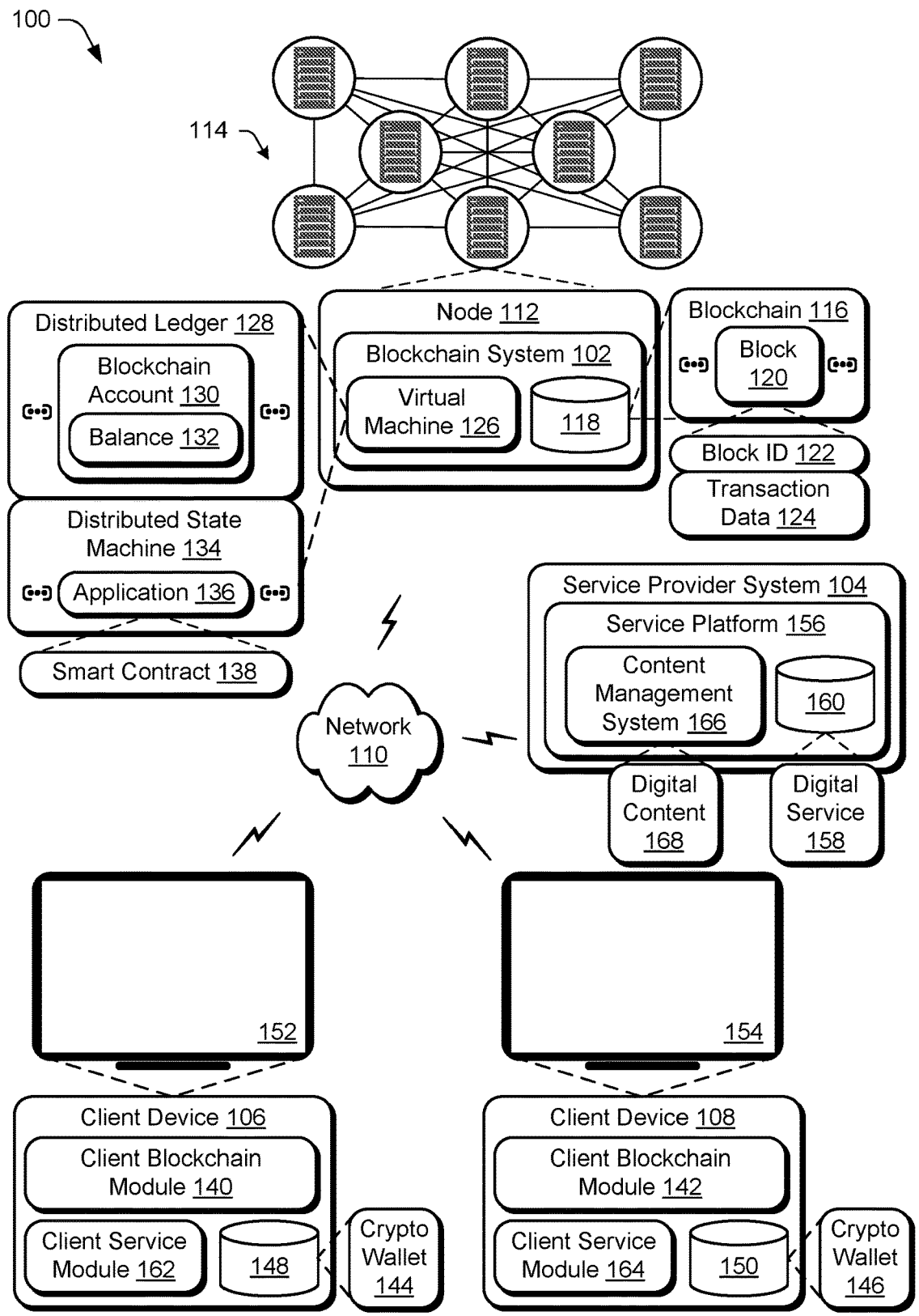
FIG. 1 is an illustration of an environment in an example implementation that is operable to employ digital content control techniques using NFTs as described herein.

Service provider systems are tasked with communicating vast amounts of digital content in support of digital services that are made available via these systems. Consequently, the service provider systems consume significant amounts of computational resources in the generation and communication of this digital content. In some instances, however, inefficiencies occur through erroneous communication of digital content and thus result in needless consumption of computational resources as well as user frustration caused by receipt of the erroneous communications.

Accordingly, techniques are described that address these challenges and thus improve operation of computing device that implement generation and communication of digital content by leveraging a blockchain. Nonfungible tokens (NFTs) are a type of token maintained on the blockchain. NFTs have a unique signature such that they cannot be traded or exchanged for one another. In some embodiments, an NFT corresponds to an item (e.g., a physical item or digital content) and describes that item. Thus, the NFT functions as a "twin" of the item, possession of which is trackable using a blockchain. To leverage this "twinning," the service provider system is configured to provide digital content based on possession of the NFT as verifiable via the blockchain.

Items with a twinned NFT can be maintained on and off the blockchain. A twinned item is configurable as a physical item (e.g., a physical object such as a wristwatch, item of clothing, product component) or as digital content, e.g., a digital image, digital audio, digital media, digital artwork, a separate NFT, applications, and so forth. Twinning involves storing data in an NFT of a twinned item that describes the item, itself. A service provider system is configured to leverage this twinned NFT data in support of a variety of functionality. In an instance in which the item is a physical item, the twinned NFT data describes physical characteristics of the physical item, e.g., from scanning the item in two or three dimensions using a physical scanner to generate a "fingerprint" of the item. In instances in which the item is digital content, the twinned NFT data describes the content itself, e.g., the data forming the digital content, as a hash of the data of the digital content, etc.

In one example, the service provider system generates digital content for communication to an entity that possesses the twinned NFT. This digital content is generated, for instance, based on previous or current transaction data, blockchain query data, NFT data, and so forth. The digital content, for instance, includes an offer redeemable by the service provider system, e.g., a discount for a subsequent transaction involving that item or a different item via the service platform thereby reducing a transaction cost. In this way, the service provider system encourages retention of the NFT and thus functionality made available via the NFT, such as to verify the corresponding item.

In this example, the service provider system is configured to obtain previous transaction data involving the twinned NFT, the transaction data indicating a first blockchain account that held the NFT. In some instances, however, the first blockchain account that held the NFT has transferred the NFT to a second blockchain account without notice to the service provider system, e.g., the transfer was not initiated by the service provider system. Accordingly, the service provider system is configured to query the blockchain to determine what blockchain account holds the NFT. Based on a response from the blockchain to the blockchain query, the service provider system determines whether the second blockchain account holds the NFT. Subsequently, a determination is made by the system as to whether a second service provider account of the system is associated with the second blockchain account. If so, the service provider exposes the digital content to the second service provider account. As such, the service provider system leverages the blockchain to improve accuracy in exposure of digital content by determining the NFT holder before exposure, preventing the service provider account of the first blockchain account to be exposed the digital content erroneously and improving operational efficiency of the computing device in providing this digital content.

In some subsequent examples, the service provider system is configured to verify possession of the NFT. This verification is performed in response of receipt of a user input requesting access to the exposed digital content. The service provider system requests data related to the NFT to verify that the entity of the service provider account holds the NFT, e.g., using blockchain keys. After successful verification, the service provider system permits access to the digital content via the service provider account. In this way, the service provider system leverages the blockchain to improve accuracy in access to digital content by verifying ownership before providing this access. Further discussion of these and other examples is included in the following sections and shown in corresponding figures.

In the following discussion, an example blockchain environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a blockchain environment 100 in an example implementation that is operable to employ techniques described herein. The blockchain environment 100 includes a blockchain system 102, a service provider system 104, and a plurality of client devices (represented as client devices 106, . . . , 108) that are communicatively coupled, one to another, via a network 110.

Computing devices that implement the blockchain environment 100 are configurable in a variety of ways. A computing device, for instance, is configurable as a desktop computer, a laptop computer, a mobile device (e.g., assuming a handheld configuration such as a tablet or mobile phone), IoT device, a wearable device, AR/VR device, a server, and so forth. Thus, a computing device ranges from full resource devices with substantial memory and processor resources to low-resource devices with limited memory and/or processing resources. Additionally, although in instances in the following discussion reference is made to a computing device in the singular, a computing device is also representative of a plurality of different devices, such as multiple servers of a server farm utilized to perform operations "over the cloud" as further described in relation to FIG. 14.

The blockchain system 102 is implemented by a plurality of nodes 112. Nodes 112 are a runtime implemented using processing, memory, and network resources of respective computing devices 114 that operate as the infrastructure of the blockchain 116. As part of this, the nodes 112 store, communicate, process, and manage data that makes up the blockchain 116. Nodes 112 are interconnected as illustrated in FIG. 1 to exchange data via the network 110, e.g., as a peer-to-peer network in a distributed and decentralized manner.

The blockchain 116 is formed using a plurality of blocks 120, illustrated in FIG. 1 as including respective block identifiers (IDs) 122 and transaction data 124. Transaction data 124 of the blocks 120 includes batches of validated transactions that are hashed and encoded. Each block 120 includes a cryptographic hash of a prior block 120 in the blockchain 116, thereby linking the blocks 120 to each other to form the blockchain 116. As a result, the blocks 120 cannot be altered retroactively without altering each subsequent block 120 in the blockchain 116 and in this way protects against attacks by malicious parties.

In order to generate the blocks 120 for addition to the blockchain 116, a node 112 is implemented as a "miner" to add a block of transactions to the blockchain 116. The other nodes 112 of the blockchain system 102 then check if the block of transactions is valid, and based on this, determine whether to accept or reject this data. If valid, the block of transactions is stored as transaction data 124 along with a block ID 122 for a respective block 120, e.g., is stored "at the end" or "at the top" of the blockchain 116 along with a hash of a previous block in the chain. The nodes 112 then broadcast this transaction history via the network 110 for sharing with other nodes 112. This acts to synchronize the blocks 120 of the blockchain 116 across the distributed architecture of the blockchain system 102. Other types of nodes 112 are also included as part of the blockchain system 102. In one such example, full nodes are nodes that store an entirety of the blockchain 116, e.g., locally in computer-readable storage media of a respective storage device 118. Other types of nodes are also employed to implement additional functionality to govern voting events, execution of protocol operations, rules enforcement, and so forth.

The blockchain system 102 implements a virtual machine 126 that is representative of a diverse range of functionality made possible by leveraging the blockchain 116. In a first such example, the virtual machine 126 implements a distributed ledger 128 of accounts 130 and associated balances 132 of those accounts 130. Distributed ledgers 128 support secure transfer of digital assets (e.g., tokens or coins of cryptocurrencies) between accounts 130 without management by a central authority through storage as part of the transaction data 124 of the blockchain 116. Through synchronized and distributed access supported by the blockchain 116 as described above, changes to balances 132 (e.g., a number of tokens) are visible to any entity with access to the blockchain 116. Techniques are also implemented to support management of the balances 132 across the accounts 130, e.g., to enforce rules that a respective account 130 does not transfer more coins than are available based on a balance 132 specified for that account 130.

In another example, the virtual machine 126 implements a distributed state machine 134 that supports application 136 execution. The distributed state machine 134 is implemented along with the transaction data 124 within the blocks 120 of the blockchain 116 such that the blocks describe accounts and balances as described above for the distributed ledger 128. The transaction data 124 also supports a machine state, which can change from block to block of the blockchain 116. In one example, the application 136 is executable as part of a "Turing-complete" decentralized virtual machine that is distributed across the nodes 112 of the blockchain system 102. As Turning-complete, the application 136 is computationally universal to perform computing device operations, e.g., logic or computing functions. Thus, the application 136 is executable by a processing system of a computing device as software that is storable in a computer-readable storage media of the nodes 112 to perform a variety of operations.

An example of an application 136 that is executable as part of the distributed state machine 134 is a smart contract 138. A smart contract 138 is executable automatically and without user intervention (or with partial human interaction as inputs when desired) by the nodes 112 of the distributed state machine 134. Execution of the smart contract 138 includes obtaining data from a specified data source (e.g., devices, APIs, and so forth that are accessible via the network 110), and based on this data, initiating one or more operations based on conditions described in the smart contract 138. In one example, the smart contract 138 is a type of account 130 that includes a balance 132 and initiates transactions based on conditions specified by the smart contract 138, e.g., to support automated escrow and other functionalities. A variety of other examples are also contemplated that support implementation of any executable operation by a computing device using software.

Cryptocurrencies (e.g., coins of the cryptocurrency) are the native asset of the blockchain 116, and tokens are created "on top" of these blockchains. In an example of a token, the smart contracts 138 implement non-fungible tokens (NFTs). NFTs include digital assets that are provably unique and as such cannot be duplicated or divided. As such, NFTs are not exchanged as having a same value as coins in cryptocurrency, but rather are digital assets having identifying information recorded as part of the smart contract 138. This identifying information is immutably recorded on that token's blockchain 116 and thus ownership of the token is also recorded and tracked. A variety of information is storable as part of the digital content represented by the NFT, examples of which include digital images, digital media, digital content, executable instructions of an application 136 as described above, secure file links, in-game tokens, digital artwork, and so forth. Other examples of tokens are also contemplated that are fungible and as such are interchangeable with each other.

The client devices 106, 108 include respective client blockchain modules 140, 142 that are representative of functionality of the client devices 106, 108 to interact with the blockchain system 102. An example of this functionality includes management of respective crypto wallets 144, 146, e.g., in local storage devices 148, 150. The crypto wallets 144, 146 store public and private cryptographic keys in this example that are used to support interaction with the blockchain system 102, and more particularly respective accounts 130 of the blockchain system 102, using respective user interfaces 152, 154.

The public key supports transactions to an address of the account 130 derived from the public key, which are stored as part of the blockchain 116 to memorialize the transaction as part of transaction data 124. In one example, an address of an account 130 is generated by first generating a private key, e.g., using a randomization technique. The corresponding public key is derived from the private key and the address of the account 130 is then derived from the public key, e.g., as an entirety of the public key or as a shortened version of the public key. The private key is used to "unlock" transactions that are "locked" by the public key and gain access to the account 130, e.g., access to coins, tokens or other information maintained as part of the transaction.

In one example, a transaction is initiated by the client device 106 with client device 108. Data of the transaction is encrypted using a public key. The transaction is then signed by client device 108 using the private key which indicates that the transaction has not been modified, e.g., by encrypting the data being sent in the transaction using the private key. The transaction is then verifiable as authentic by using the public key included with the data. The nodes 112 use the accompanying public key to automatically verify authenticity that the transaction is signed using the private key. Transactions that fail authentication are rejected by the nodes 112. Authentic transactions are used as part of transaction data 124 in minting blocks 120 by the nodes 112 that are added to the blockchain 116, e.g., as part of the distributed ledger 128. In this way, the virtual machine 126 of the blockchain system 102 supports a variety of functionality through use of the distributed ledger 128, distributed state machine 134, and/or other blockchain and cryptographic functionality.

The blockchain environment 100 also includes a service provider system 104 implementing a service platform 156 of digital services 158, illustrated as maintained in a storage device 160 and are executable via a processing system. Digital services 158 involve electronic delivery of data and implementation of data functionality by computing devices to support a range of computing device operations. Digital services 158, for instance, include creation, management, and dissemination of digital content via the network 110, e.g., webpages, applications, digital images, digital audio, digital video, and so forth. The digital services 158 are also implemented to control access to and transfer of physical goods and services through corresponding digital content, e.g., sales, product listings, advertisements, etc. Digital services 158 further pertain to operation of computational resources (e.g., processing, memory, and network resources) of computing devices that support the access to and management of the digital content by the system.

Functionality of the client devices 106, 108 to access the digital services 158 of the service provider system 104 is represented by respective client service modules 162, 164. The client service modules 162, 164, are configurable as browser, network-enabled applications, third-party plugins, and so on to access the digital services 158 via the network 110.

The service provider system 104 also includes a content management system 166. The content management system 166 by the service provider system 104 is configured to generate, expose, and/or control access to digital content 168. The digital content may be controlled through use of an application 136 generated by the service provider system 104 and executed by the distributed state machine 134. The service platform 156, for instance, includes a digital service 158 configured to support transactions of items, e.g., physical items or digital content, using service provider accounts.

In the "twinning" example above, the NFT corresponds to an item (e.g., a physical item or digital content) and describes that item. Thus, the NFT functions to verify the item that is the subject to the transaction and as such increases value of the item through publicly verifiable ownership of the NFT. To leverage this "twinning," blockchain queries initiated by the service provider system can be used to determine/verify ownership of the NFT. The data received from the blockchain queries provides the service provider system 104 with up-to-date data. This data is leveraged such that digital content 168 is exposed to the correct entity, and as such, improve the operation of the service provider system 104.

Further, the digital content 168 is configurable to encourage retention of the NFT by an entity, such as a user, that owns the item. An example of this is configuring the digital content 168 to include an offer. The offer is redeemable by the service provider system 104 to encourage future interaction with the service provider system 104, such as through a reduction in a transaction fee for a subsequent sale of the item or a different item via the service platform 156. In this way, the digital content 168 encourages an entity that possess the item to also maintain possession of the NFT and thus retain an ability to verify authenticity of the item associated using the NFT. Further discussion of these and other examples is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Digital Content Using NFTs

Figure 2:
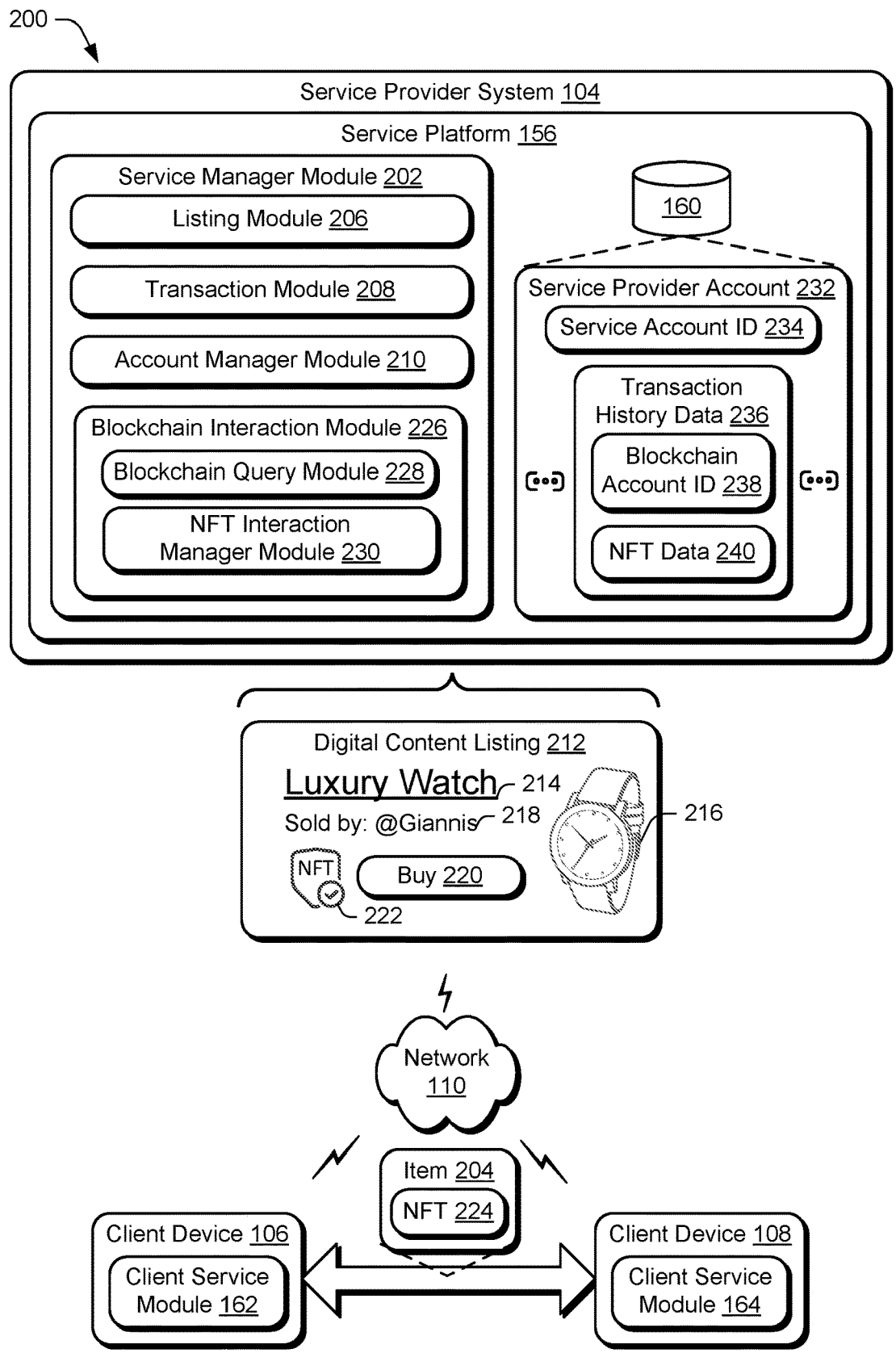
FIG. 2 depicts a system in an example implementation showing operation of a service platform of a service provider system of FIG. 1 in greater detail as implementing a transaction between client devices.
Figure 3:
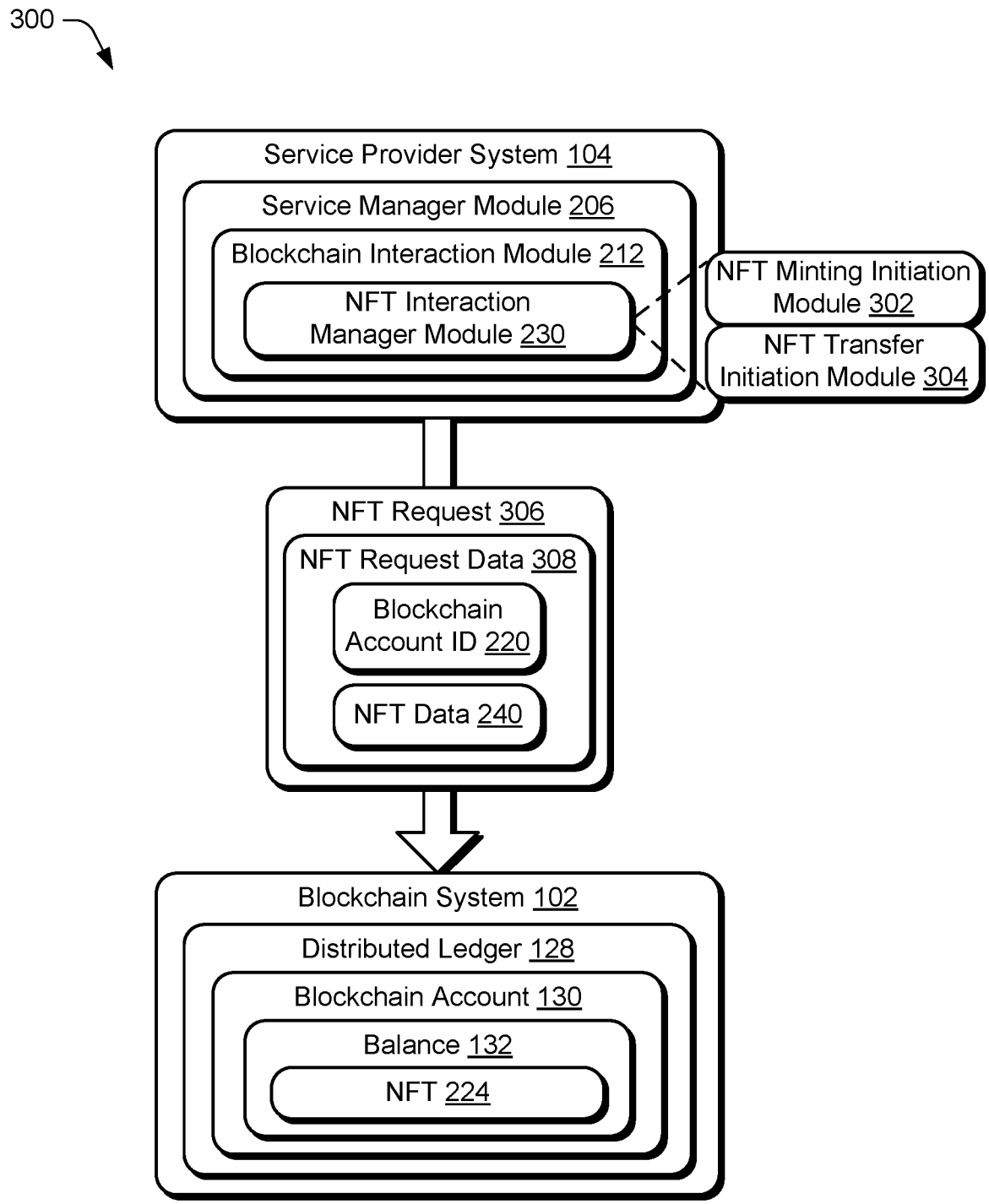
FIG. 3 depicts a system in an example implementation of initiating NFT interaction with a blockchain system by the service provider system of an NFT responsive to the transaction of FIG. 2.
Figure 4:
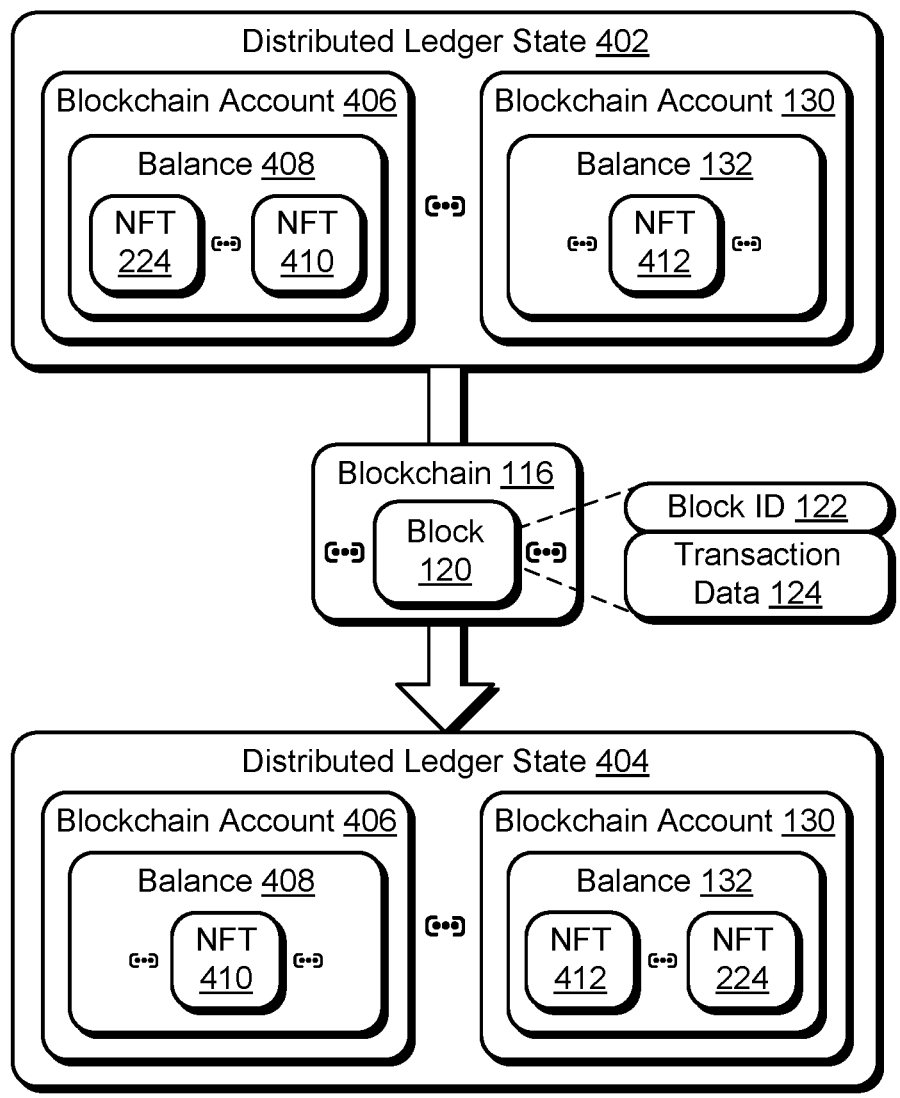
FIG. 4 depicts a system in an example implementation showing transfer of the NFT on the blockchain of FIG. 3 in greater detail.
Figure 5:
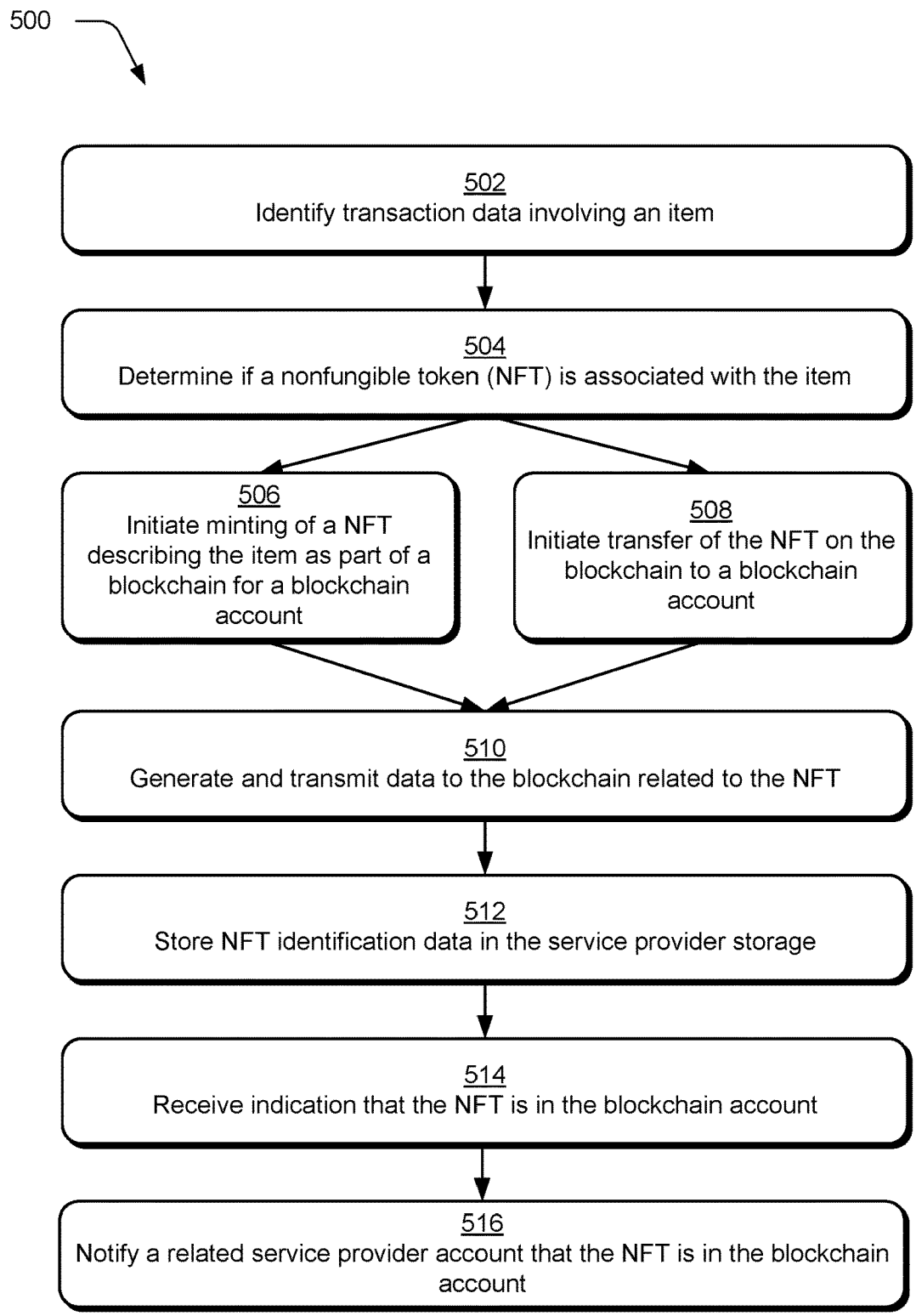
FIG. 5 is a flow diagram depicting a procedure in an example implementation of initiating NFT interactions with the blockchain.
Figure 6:
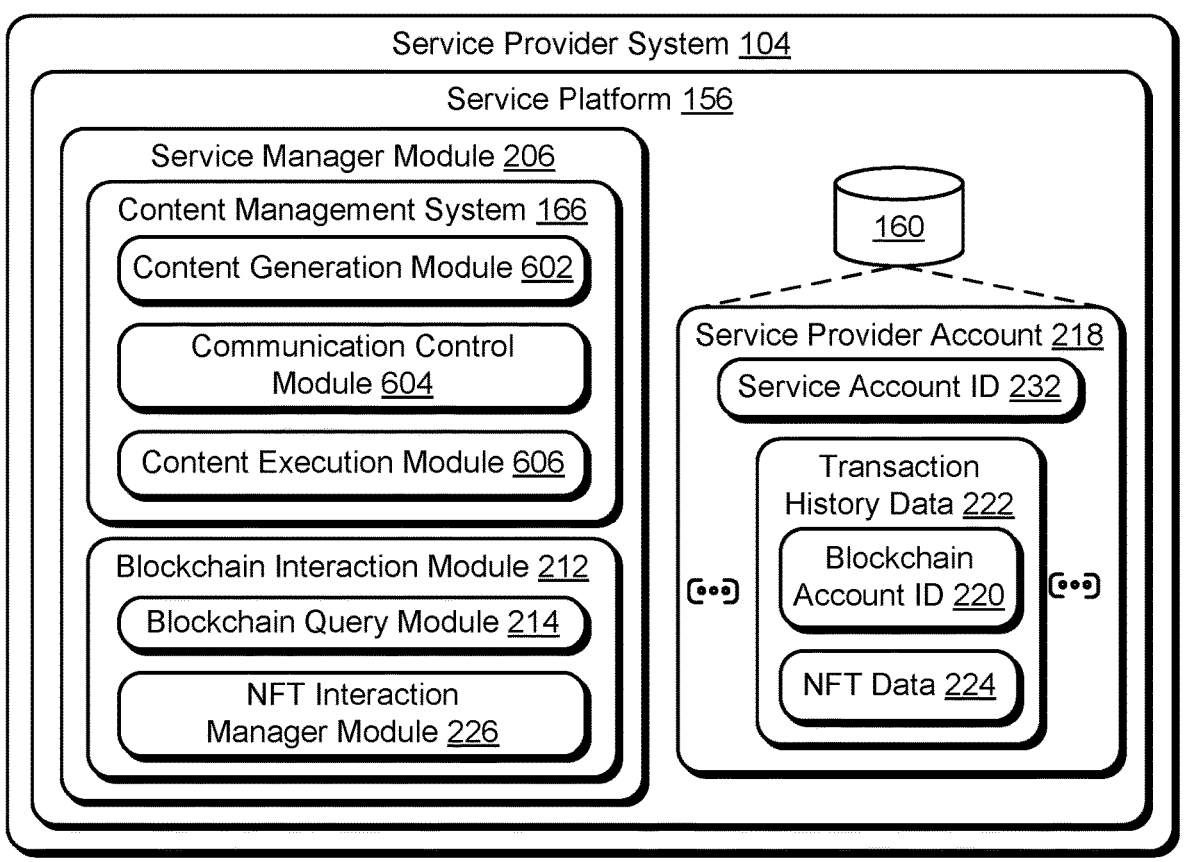
FIG. 6 depicts a system in an example implementation showing generation of the digital content of FIG. 2 in greater detail.
Figure 7:
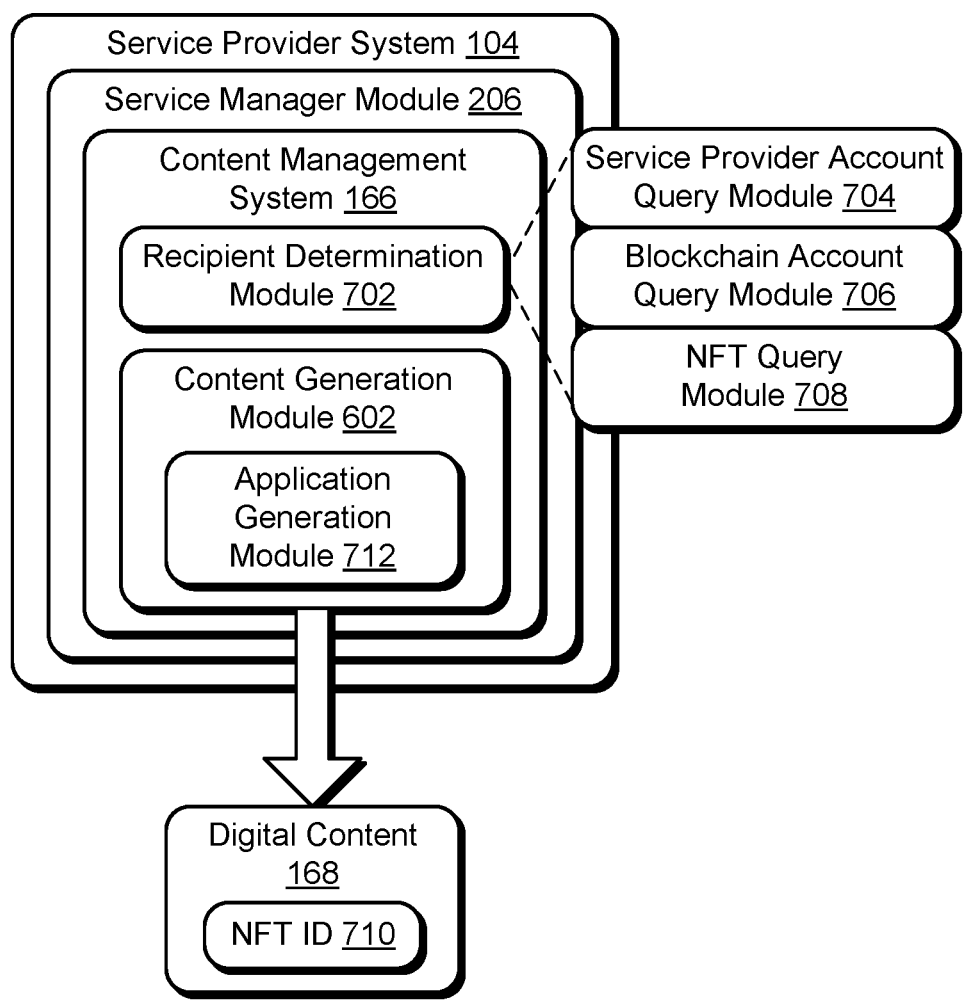
FIG. 7 depicts a system in an example implementation of digital content generation.
Figure 8:
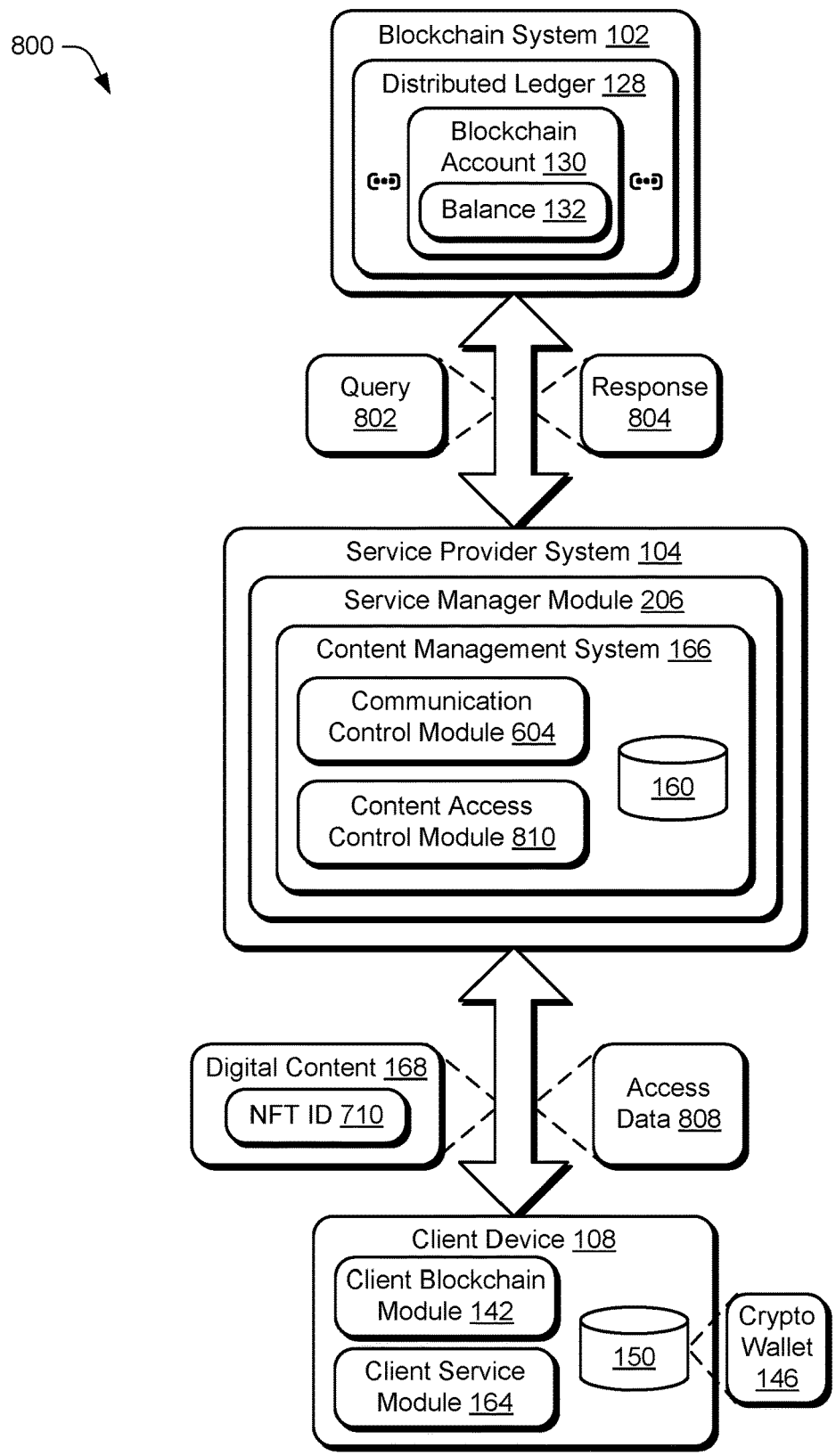
FIG. 8 depicts a system in an example implementation in which communications between the service provider system, the blockchain system, and a client device are used to verify access to digital content based on possession of the NFT.
Figure 9:
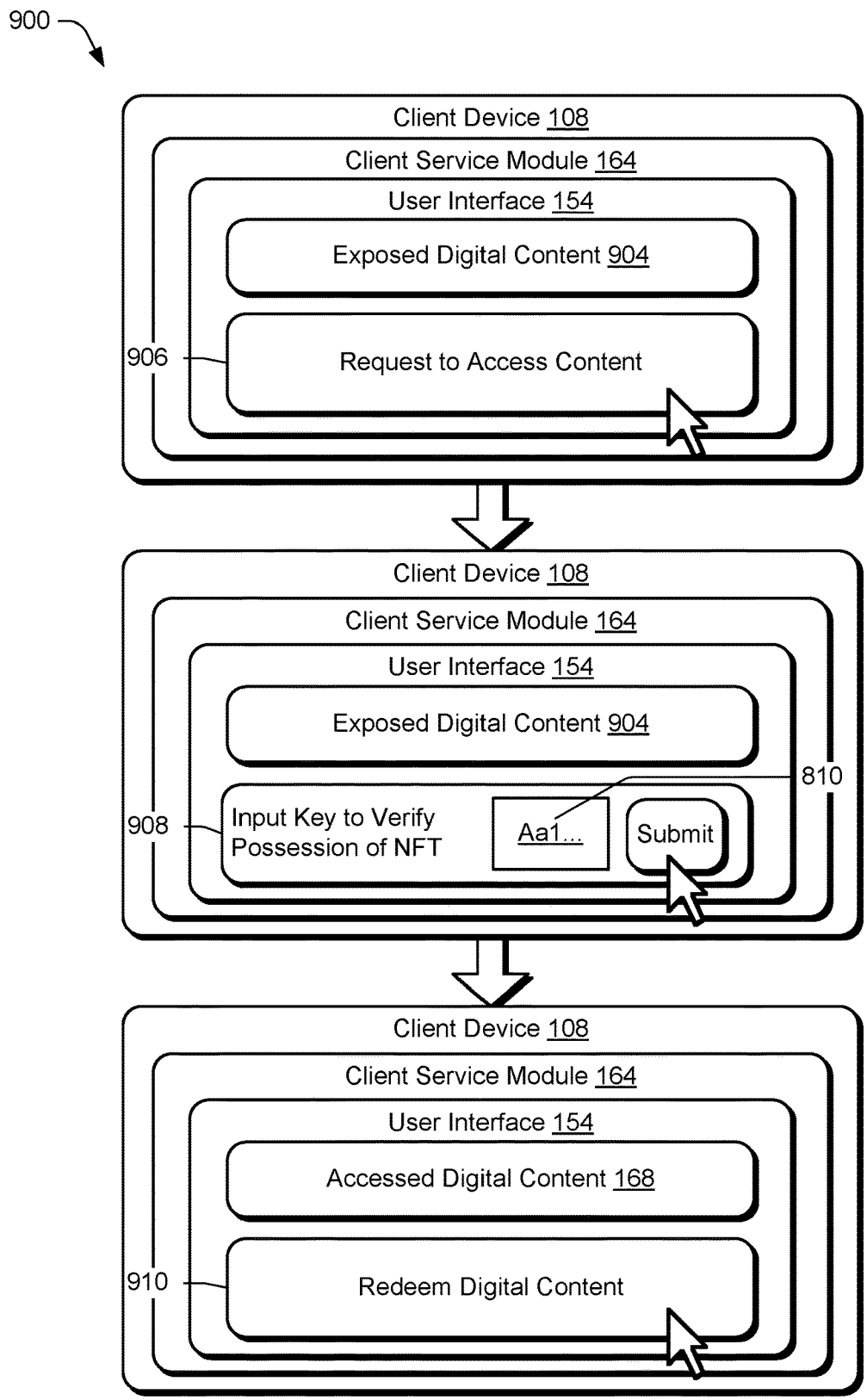
FIG. 9 depicts an example implementation of a computing device requesting access to digital content from the service provider system.
Figure 10:
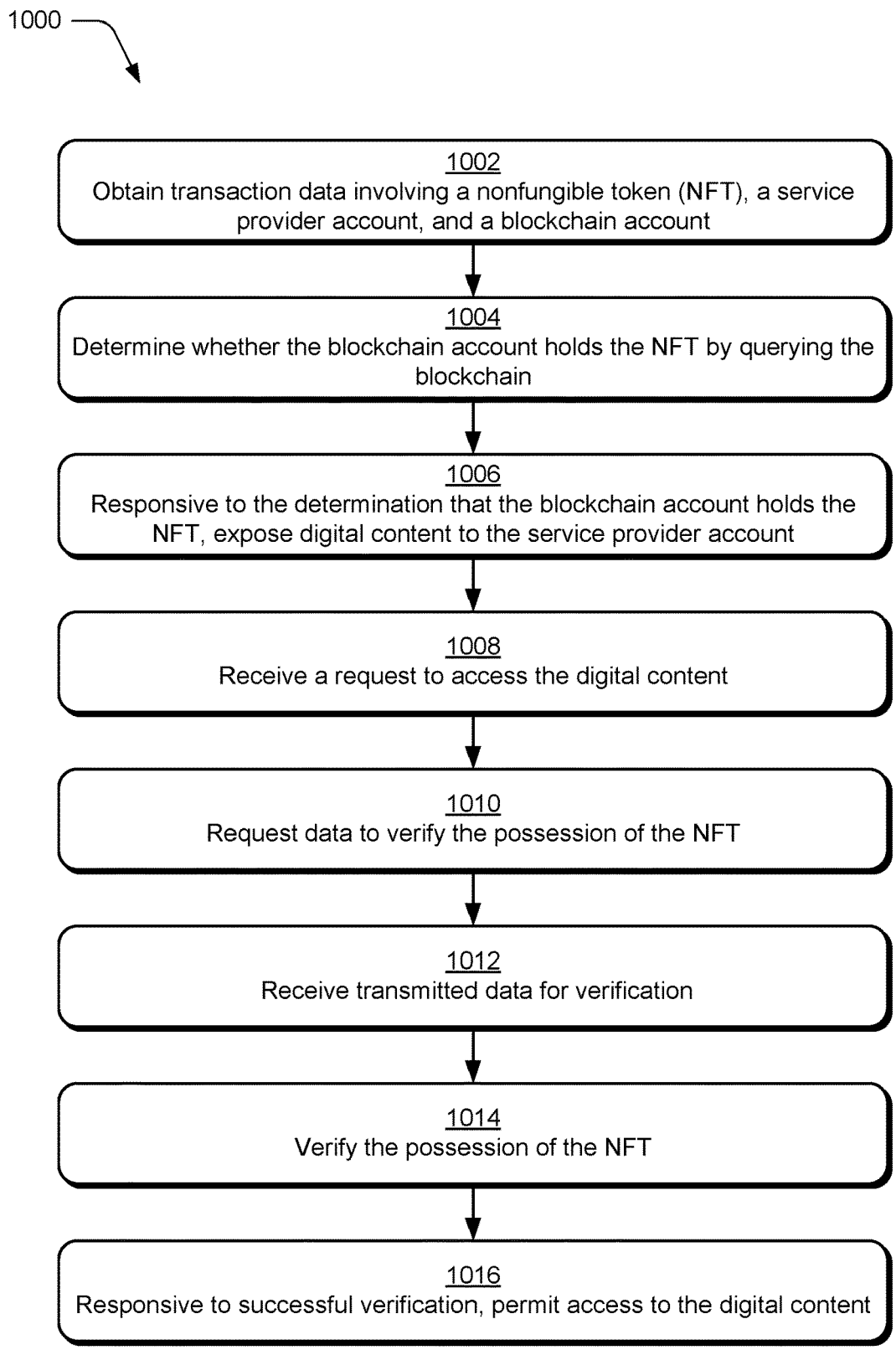
FIG. 10 is a flow diagram depicting a procedure in an example implementation in which digital content is exposed and accessed by a user based on possession of an NFT.
Figure 11:
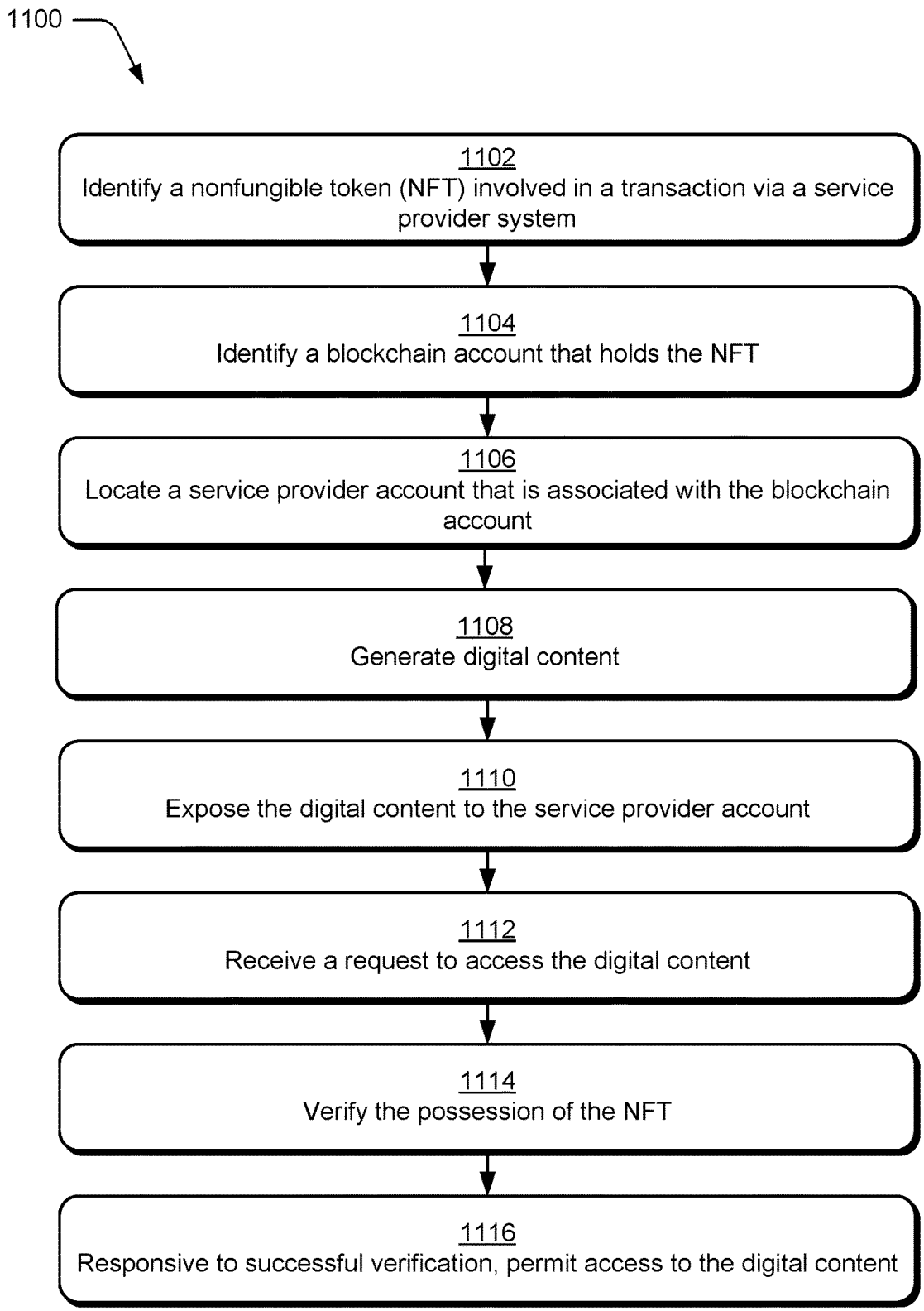
FIG. 11 is a flow diagram depicting a procedure in an example implementation in which a service provider account is located, and digital content is exposed.
Figure 12:
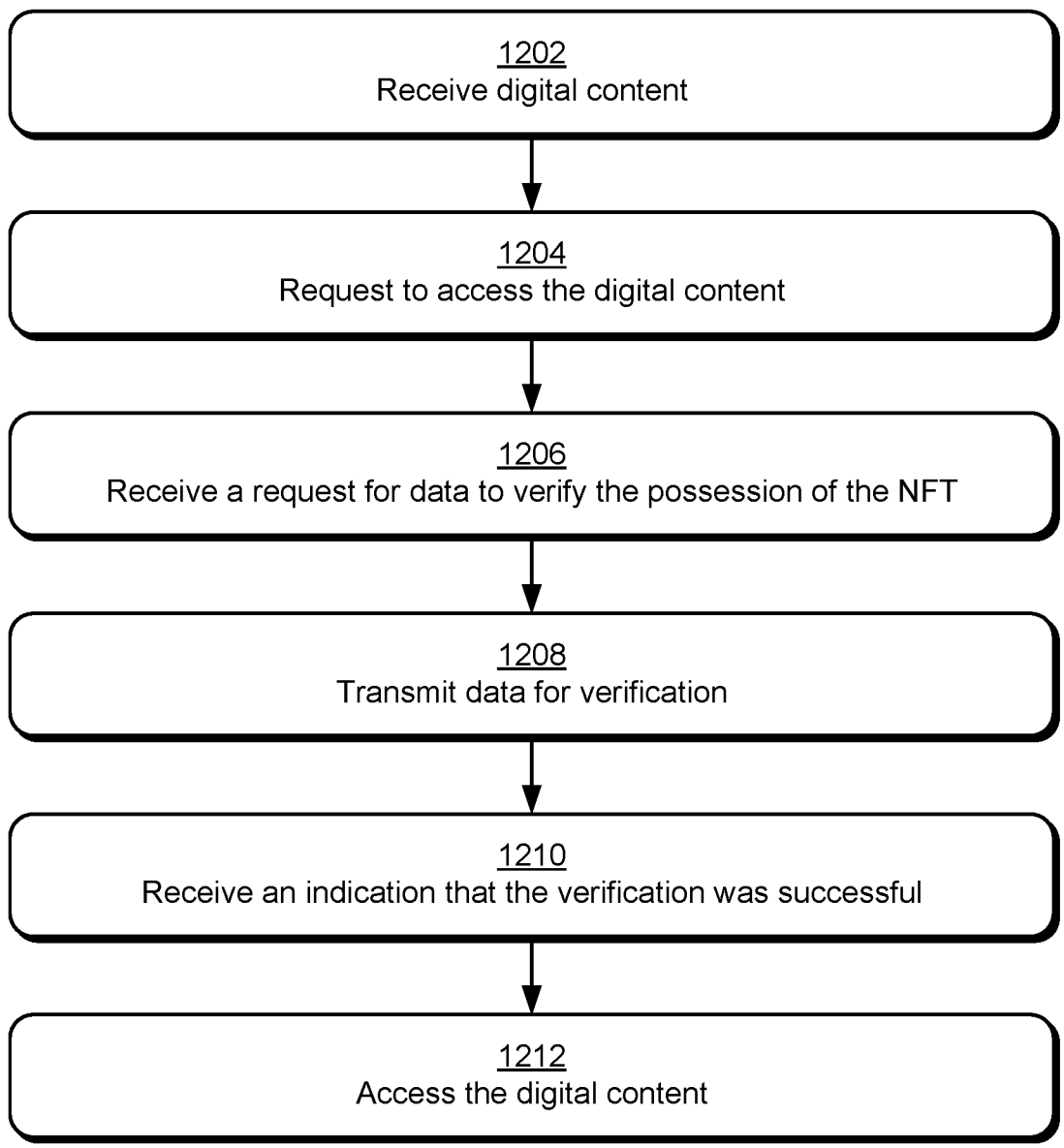
FIG. 12 is a flow diagram depicting a procedure in an example implementation in which data is shared between computing devices for digital content access.
Figure 13:
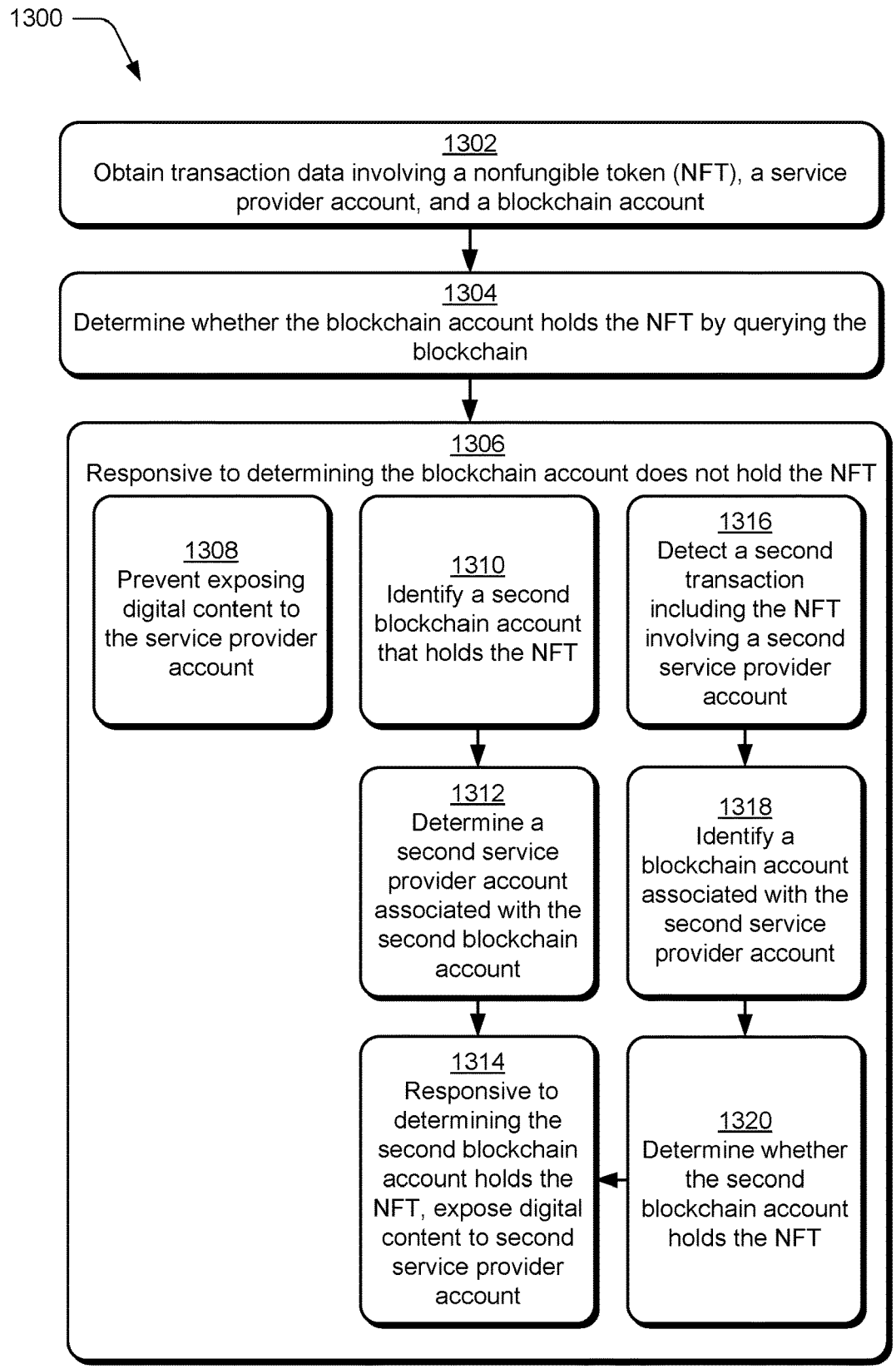
FIG. 13 is a flow diagram depicting a procedure in an example implementation in which a determination that a blockchain account does not hold a NFT is made.

FIG. 2 depicts a system 200 in an example implementation showing operation of the service provider system 104 and client devices 106 and 108 of FIG. 1 in greater detail as interacting with a digital-content listing with an associated NFT. FIG. 3 depicts a system 300 in an example implementation of initiating NFT interaction with a blockchain system 102 by the service provider system 104 of an NFT responsive to the transaction of FIG. 2. FIG. 4 depicts a system 400 in an example implementation showing transfer of the NFT on the blockchain 116 of FIG. 3 in greater detail. FIG. 5 depicts a procedure 500 in an example implementation of initiating NFT interactions with the blockchain 116. FIG. 6 depicts a system 600 in an example implementation showing generation of the digital content of FIG. 2 in greater detail. FIG. 7 depicts a system 700 in an example implementation of digital content generation. FIG. 8 depicts a system 800 in an example implementation in which communications between the service provider system 104, the blockchain system 102, and a client device 108 are used to verify access to digital content based on possession of the NFT. FIG. 9 depicts an example implementation 900 of a computing device 108 requesting access to digital content 168 from the service provider system 104. FIG. 10 is a flow diagram depicting a procedure 1000 in an example implementation in which digital content is exposed and accessed by a user based on possession of an NFT. FIG. 11 is a flow diagram depicting a procedure 1100 in an example implementation in which a service provider account is located, and digital content is exposed. FIG. 12 is a flow diagram depicting a procedure 1200 in an example implementation in which data is shared between computing devices for digital content access. FIG. 13 is a flow diagram depicting a procedure 1300 in an example implementation in which a determination that a blockchain account does not hold a NFT is made.

The following discussion describes techniques that may be implemented utilizing the previously described systems and devices. Aspects of the procedure as shown stepwise may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-14.

To begin in the illustrated example of FIG. 2, a service provider system 104 includes a service platform 156 having a service manager module 202. The service platform 156 is configured to support transactions between client devices 106, 108, e.g., by implementing digital services 158 that are executable to transfer ownership and/or possession of an item 204 from client device 106 to client device 108. The digital services 158 are accessible via the network 110 using respective client service modules 162, 164 (e.g., browsers, network-enabled applications, plug-in modules, and so forth) executable by respective client devices 106, 108.

Examples of digital services 158 implemented by the service platform 156 in support of transactions are represented as a listing module 206, a transaction module 208, and an account manager module 210. The listing module 206 is configured to generate a digital content listing 212 indicating an item 204 is available for purchase/transfer via the service platform 156. The listing module 206, for instance, exposes functionality that is accessible via the network 110 by the client device 106 to generate a digital content listing 212 indicating availability of the item 204. The digital content listing 212 is then exposed for access via the network 110 to potential purchasers, e.g., to client device 108 as a webpage, display in a dedicated application, and so forth.

The client device 106, through the client service module 162, transmits a request, which is received by the listing module 206 to list the item 204 using digital content. The request specifies information describing the item 204, e.g., a textual description 214 and digital image 216, for inclusion as part of the digital content listing 212. The client device 106 also identifies a provider of the item 204, e.g., as a seller 218. The digital content listing 212, once generated, also includes an option 220 that is user selectable via a user interface to initiate the transaction, e.g., to "buy" or otherwise transfer possession and/or ownership of the item 204. The item 204 is then listed using the digital content 168.

The digital content listing 212 is configurable to include a variety of other information, such as to include a badge 222 indicating that ownership of an NFT 224 corresponding to the item 204 has been verified. The service provider system 104, for instance, employs a blockchain interaction module 226 to access functionality made available via the blockchain 116 implemented by the blockchain system 102. An example of this is a blockchain query module 228 that is configured to determine and/or verify ownership of the NFT 224 associated with the item 204 by querying the distributed ledger 128 maintained as part of the blockchain 116, e.g., that the NFT 224 "twin" of the item 204 is associated with a particular blockchain account 130.

In the example of FIG. 2, the NFT 224 is illustrated as included as part of a transfer of ownership/possession of the item 204. The NFT 224, for instance, is communicated to the client device 108, such as via user input of a blockchain key or an NFT identifier (ID). However, in at least some instances the NFT 224 is not communicated to the client device 108 but rather is detected via transaction data on the service platform 156, and/or identified by leveraging the blockchain 116. Alternatively, it may be determined by the service provider system 104 that a twin NFT 224 has not yet been minted for the item 204.

The blockchain interaction module 226 also includes functionality represented by an NFT interaction manager module 230 to manage additional NFT interactions, including functions to initiate minting and transfer of the NFT 224 between blockchain accounts.

The account manager module 210 is representative of functionality to manage a plurality of service provider accounts 232 and information associated with the accounts. The service provider accounts 232 are associated with respective users to support transactions and interact with functionality made available via the service platform 156. This includes service accounts IDs 234 that uniquely identify the service provider accounts 232 and transaction history data 236 identifying transactions performed using respective accounts, e.g., from a service provider account associated with client device 106 to a service provider account associated with client device 108. The transaction history data 236, therefore, is configured to include a variety of information, examples of which include blockchain account ID 238 used for cryptographic transactions, e.g., to receive an NFT 224 as part of the transaction, NFT data 240 describing the item 204 and/or transaction that is to be used to mint the NFT 224 and/or transfer the NFT 224 to a different blockchain account, and so forth.

The service manager module 202, for instance, generates the digital content listing 212 responsive to inputs received from client device 106 via the network 110. Another client device 108, after viewing this digital content listing 212 via the network 110, initiates a transaction to obtain the item 204, e.g., through selection of the option 220. The transaction transfers ownership of the item 204 (e.g., responsive to verification of a transfer of funds which may include cryptographic coins or other conventional monetary currencies), which is recorded as part of transaction history data 236. The transaction history data 236 thus memorializes the transaction and is usable as a basis to initiate the addition of block 120 for the transfer and/or minting of the NFT 224 on the blockchain 116. Accordingly, NFT 224 can be leveraged to control exposure and access to digital content 168 in the following discussion. Thus, this data generated by the transaction module 208 responsive to completion of the transaction of the item 204 is received and stored by the account manager module 210 as part of the service provider account 232.

Upon completion of the transaction, the service provider system 104 is configured to initiate minting and/or transfer of the NFT 224 by the blockchain system 102. The account manager module 210 identifies the stored transaction data involving the item 204 (block 502), such as the service provider account 232 associated with the client device 108 (and more particularly a user interacting with that device) that is to obtain ownership of the item 204 in the previous example. From this, the account manager module 210 also identifies a blockchain account ID 238 corresponding with a blockchain account 130 that is to receive the NFT 224. The account manager module 210 is further configured to determine whether an NFT 224 is associated with the item 204, i.e., the item 204 has a twinned NFT (block 504). Based on this determination, an NFT request 306 is generated to mint or transfer NFT 224 to the blockchain account 130 by the NFT interaction manager module 230. Additionally, the NFT interaction manager module 230 may initiate minting/transfer of the NFT 224 responsive to, for instance, user request, receipt of currency/a voucher for NFT minting, automatic determination, and so forth.

In an NFT minting example, an NFT minting initiation module 302 is configured by the NFT interaction manager module 230 to interact with the blockchain system 102 to cause the NFT 224 to be minted as part of the blockchain 116 (block 506). The NFT minting initiation module 302 initiates the minting by transmitting an NFT request 306 to the blockchain system 102 to mint NFT 224 for blockchain account 130.

In an NFT transfer example, from the transaction history data 236, the account manager module 210 identifies an additional service provider account related to a blockchain account 406 that holds the NFT 224 before the transfer and forfeiting of the NFT 224 to the receiving blockchain account 130. Then, an NFT transfer initiation module 304 is configured to interact with the blockchain system 102 to cause the NFT 224 to be transferred from the forfeiting blockchain account 406 to the receiving blockchain account 130 of the blockchain 116 (block 508), as illustrated in FIG. 4.

In this transfer example, a first state 402 of the distributed ledger 128 illustrates that the forfeiting blockchain account 406 holds the NFT 224 in the balance 408, along with other NFTs 410 and other blockchain tokens, and that the receiving blockchain account 130 holds NFTs 412 and other blockchain tokens in the balance 132. The NFT transfer initiation module 304 transmits an NFT request 306 to the blockchain system 102 to transfer the subject NFT 224 from the forfeiting blockchain account 406 to the receiving blockchain account 130.

In some instances of the minting and transfer examples, NFT request data 308 is generated by the NFT interaction manager module 230 to be transmitted with the NFT request 306 (block 510). The NFT request data 308 is configured to identify a variety of criteria with respect to the transaction, e.g., identification data of the item, a generated application 136, digital content that provides functionalities to the owner of the NFT, and so forth. The NFT request data 308 is also configurable to include options for the NFT request 306. For example, as part of initiating a request to mint, an option is provided to specify which blockchain system 102 from a plurality of blockchain systems, on which, the NFT 224 will be maintained. The NFT interaction manager module 230 is configurable to display a user interface via which user inputs are received to indicate which options of the NFT request data 308 are to be selected for transmission with the NFT 224. The NFT interaction manager module 230 is further configurable to provide an option to specify that the NFT 224 is to be output for user selection on the service provider account 232. For instance, the NFT interaction manager module 230 identifies a brand in the data describing the item 204 that does not match the service provider account 232, and accordingly prevents output of an option for collecting royalties to the service provider account 232. In some instances, at least part of the NFT request data 308 is automatically decided by the NFT interaction manager module 230. A variety of other instances are also contemplated of request data 308 for the NFT request 306. The NFT request data 308 may be included in the transaction data 124 of the NFT.

After the NFT request 306 configured to initiate minting/transfer of the NFT 224 is transmitted to the blockchain 116, block 120 is minted by the blockchain 116 as described above in relation to FIG. 1. As a result of successful minting of block 120, the subject NFT 224 is successfully minted/transferred to the blockchain account 130. In the transfer example, this is illustrated in the second state 404 of the distributed ledger 128, showing that the NFT 224 has been received by the receiving blockchain 130. As a result of both the minting and transfer example, the NFT 224 is held in blockchain account 130 as part of the distributed ledger 128. The NFT 224 is accessible using a private key maintained in a crypto wallet 146 of the owner of the NFT 224. The transaction data 124 is minted by nodes 112 of the blockchain system 102 and through this is incorporated within a block 120 of the blockchain 116. Accordingly, the NFT 224 is recorded in an irreversible and tamper-proof manner in the distributed ledger 128.

The NFT request data 308 and resulting data of the NFT request 306, such as block ID 122, is storable in the service provider storage device 160 for subsequent use by the service provider system 104 (block 512). The service provider system 104, for instance, receives an indication from the blockchain 116 that the NFT request 306 was completed (block 514). As such, the NFT interaction manager module 230 notifies the user via the service provider account 232 that the NFT is associated with their blockchain account 130 (block 516). The notification is output in a variety of ways, e.g., instance message, text, email.

FIG. 6 depicts an example showing operation of the content management system 166 in greater detail. The content management system 166 in this example is configured to generate and expose digital content 168 for access by the client device 108. Functionality of the content management system 166 is represented by a content generation module 602 configured to generate the digital content 168, a communication control module 604 configured to control communication of the digital content 168 to the service provider account 232, and a content execution module 606 configured to implement functionality of the digital content 168.

As shown in the example of FIG. 7, the content management system 166 includes a recipient determination module 702 that is configured to determine a service provider account 232 to receive the digital content 168. Functionality to assist in doing so includes a service provider account query module 704, a blockchain account query module 706, and an NFT query module 708 that are configured to leverage information made available via service provider accounts 232, blockchain accounts 130, and NFTs 224, respectively.

In a first example, the service provider account query module 704 is configured to query service provider accounts 232 and more particularly transaction history data 236 associated with those accounts. This is performed to locate information usable to determine "who" is to receive the digital content 168, e.g., which accounts involve transactions involving particular items 204 and/or NFTs 224 (blocks 1002 and 1302). For example, this is usable to determine which items 204 and/or NFTs 224 have been a subject of a transaction using corresponding service provider and blockchain accounts and based on this configure the digital content 168 for corresponding NFTs based on these items.

The blockchain account query module 706 is configured to leverage information made available via blockchain accounts 130. Continuing with the first example above, the blockchain account query module 706 queries the blockchain 116 to determine whether the corresponding NFT 224 is still possessed/owned by a blockchain account 130 referenced by the service provider accounts 232 (blocks 1004 and 1304). If so, generation and communication of the digital content 168 continues.

If the corresponding NFT 224 is not possessed/owned by a blockchain account 130 referenced by the service provider account 232, various embodiments are considered (block 1306). In one embodiment, the content management system 166 prevents the digital content 168 from being generated and/or exposed to the service provider accounts 232 (block 1308). In a second embodiment, the content management system 166 identifies a second blockchain account that holds the NFT 224 (block 1310), determines a second service provider account associated with the second blockchain account (block 1312), and responsive to determining the second blockchain account holds the NFT, exposing the digital content to the second service provider account (block 1314), as similarly described below in the second example. In a third embodiment, a second transaction is detected on the service platform 156 involving NFT 224 and a second service provider account (block 1316). The content management system then proceeds as described above in the first example by identifying a blockchain account associated with the second service provider account (block 1318), determining whether the second blockchain account holds the NFT (block 1320), and responsive to determining the second blockchain account holds the NFT, exposing the digital content to the second service provider account (block 1314). In each embodiment, the digital content 168 is not generated and/or communicated to any device associated with a user (e.g., client device) if it cannot be determined that a user of the service provider accounts 232 holds the NFT 224 in the user's blockchain account 130. As a result, computational resources of both the service provider system 104 and the client device 108 are conserved.

In a second example, the service provider account query module 704 queries the service provider accounts 232 to identify an NFT 224 that was involved in a transaction on the service provider system (block 1102). The query includes locating an NFT ID 710 that references the NFT 224 that is a subject of the digital content 168. Then, the NFT query module 708 queries the blockchain 116 to identify a blockchain account 130 that holds the NFT 224 (block 1104). The identified blockchain account 130 is leveraged by the service provider account query module 704 to locate a service provider account 232 that is associated with the identified blockchain account 130 (block 1106), i.e., to determine if there is a service provider account 232 to receive the digital content 168 of the NFT 224. If so, generation and communication of the digital content 168 continues. If not, digital content 168 is not generated, thereby conserving computational resources of the service provider system 104.

The recipient determination module 702 can also perform queries of the service provider accounts 232 to determine "how" the digital content is to be communicated. In one example, a determination is made that a transaction involving a particular NFT 224 is associated with the service provider account 232. The service provider account 232 includes various types of data, such as profile data, demographic data, preference data, network address data, and so forth. In this example, the recipient determination module 702 leverages this data to determine a preferred method of communication. For instance, based on the data of the service provider account 232, the recipient determination module 702 determines that the preferred network address associated with the service provider account 232 for communication is email. As such, the email associated with the service provider account 232 is used to send the digital content 168 using the communication control module 604. Access to functionality of the digital content 168 is controlled by the content management system 166 through verification of possession of the NFT 224, e.g., to "unlock" the digital content.

A content generation module 602 is configured to generate the digital content 168 (block 1108) and include the NFT ID 710. The content generation module 602 generates digital content based on available data, such as the NFT data 240, data from the service provider account 232 (e.g., current listings of the service provider account), and/or data from queries of the blockchain account 130, e.g., data indicating other NFTs 412 and other blockchain tokens. Content includes text, images, unique codes, and executable functionality that is to be included for display to a recipient of the digital content 168 and to make associated functionality available, e.g., access to an offer for a discount, a market value determination of the NFT 224, a second NFT, and so on. Content is configurable in a variety of ways, examples of which include owner's manuals, digital receipts, bills of sale, product keys, shipping information, digital marketing content, offers redeemable by the service provider system 104, added functionality on the listing 212 of the item 204, etc. Content in some examples is configured to encourage retention of the NFT 224 such that the NFT 224 is available at a later time to verify authenticity of the item 204, e.g., by the service provider system 104. In some other examples, at least part of the content is configurable to be displayed and/or interacted with by other users of the service platform 156, e.g., on a listing 212 of the item 204 where the twinned NFT transaction history is displayed, automatic transfer of NFT 224 as described above upon purchase of the item 204, a priority display location of the listing 212, etc. In this way, recipients of the NFT 224 are encouraged to maintain possession of the NFT 224 to avail themselves of this functionality.

For example, digital content 168 is generated for service provider account 232. The digital content includes an image of the item 204 from the NFT data 240 is identified and combined in a selectable display describing the digital content available, e.g., text including "Redeem a Discount". Functionality of the digital content, in this example to redeem the discount, is also generated but is not necessarily available for access by the user of the service provider account 232 until NFT possession is verified as described below. After the service provider account is permitted access to the digital content based on successful verification, the digital content 168 is available to the user to apply the discount to a purchase.

In some instances, an application generation module 712 generates an application 136 included in the functionality in the digital content 168 and is configured to control access to the digital content 168 responsive to verification of the NFT 224.

FIG. 8 depicts a system 800 in an example implementation in which communications between the service provider system 104, the blockchain system 102, and a client device 108 are used to verify access to digital content based on possession of the NFT 224. The content management system 166 is configured to send queries 802 to and receive responses 804 from the blockchain system 102 via the network 110, as described above. The content management system 166 is further configured to send digital content 168 and requests for data to the client device 108 and receive access data 808 and access requests from the client device 108 via the network 110.

For example, the content management system 166 sends a query 802 including the NFT ID 710 to the blockchain system 102 to determine a blockchain account that holds NFT 224. Then, the blockchain system 102 transmits a response 804 to the query 802 that identifies a blockchain account 130 as the blockchain account that holds the NFT 224 in the balance 132. After the blockchain account 130 is identified, the content management system 166 generates the digital content 168 for the service provider account 232 related to the blockchain account 130 as described above. Then, the content management system 166 exposes the digital content 168 to the service provider account 232 on the client device 108 via the client service module 164. Then, the content management system 166 receives access data 808, such as a request for access, a private key for verification, and so forth. The communication between the content management system 166 and client device 108 is further described below.

In the illustrated example of FIG. 9, the communication control module 604 exposes digital content 904 to the service provider account 232 corresponding with the user of the client device 108 (blocks 1006 and 1110). The client device 108 is configured to receive and cause display on a user interface 154 of the exposed digital content 904 (block 1202). In this example, the exposed digital content 904 is generated as part of digital content 168 but does not include at least part of the digital content 168. The exposed digital content 904 includes an option 906 that is user selectable via the user interface 154 to request access to the digital content 168 (block 1204). Upon receipt of user selection of option 906 (blocks 1008 and 1112), the communication control module 604 transmits a request for data 910 to verify the possession of the NFT 224 by the user (blocks 1010 and 1114). Responsive to receiving the request for access data 808 (block 1206), the client device 108 causes display on the user interface 154 for user input 908 of the access data 808. In one instance, the access data 808 includes a private key to access to the blockchain account 130 and/or NFT 224. In another instance, the access data 808 includes data for verification of possession the item 204, e.g., by a "rescan" by the service provider system using a physical item scanner to verify the physical characteristics or "fingerprint" of the item. Then, the client device 108 transmits the access data 808 (block 1208) via the network 110. The communication control module 604 passes the received access data 808 to a content access control module 810 (block 1012) which is configured by the content management system 166 to verify ownership of the NFT 224 via a query 802 to the blockchain 116 with the requested data 910 (blocks 1014 and 1114). Using the response 804 to the query 802 from the blockchain 116, the content access control module 810 verifies the possession of the NFT 224. Responsive to successful verification, the content access control module 810 notifies the user of successful verification and permits access to the digital content 168 on the service provider account 232 (blocks 1016 and 1116). Responsive to unsuccessful verification, the content access control module 810 does not permit access to the digital content 168 and may notify the user of unsuccessful verification. In one instance, the digital content 168 may not be completely generated (e.g., only the exposed digital content 904 is generated) until successful verification is performed to improve computational efficiency. As such, the client device 108 receives an indication that the verification was successful (block 1210) or not. If successful, the user can access the digital content 168 via the service provider account 232 (block 1212). In an alternative example, the access data 808 may be transmitted to the service provider system 104 for verification automatically and without user intervention via the crypto wallet 146.

Moreover, the content management system 166 can perform various embodiments of the above-described examples subsequent to an initial recipient determination. In one instance, the content management system 166 exposed the digital content 904 to the service provider system and received a request to access the digital content 168 more than a threshold amount of time since exposure, e.g., a threshold number of minutes, hours, days, and so forth. The content management system 166 performs an additional recipient determination before verifying the possession of the NFT 224 by the blockchain account 130 of the user. In another instance, the content management system 166 receives additional data, such as indication of a second service provider account creating a second listing with the NFT 224, and initiates recipient determination for the digital content 168 accordingly. As such, the service provider system leverages the blockchain to improve accuracy in exposure of digital content by determining the holder of the NFT and preventing a service provider account of a blockchain account that does not hold the NFT to be exposed and/or receive access to the digital content erroneously. This improvement in accuracy further improves the operational efficiency of the service provider system because digital content is provided to the user who holds the NFT.

Example System and Device

Figure 14:
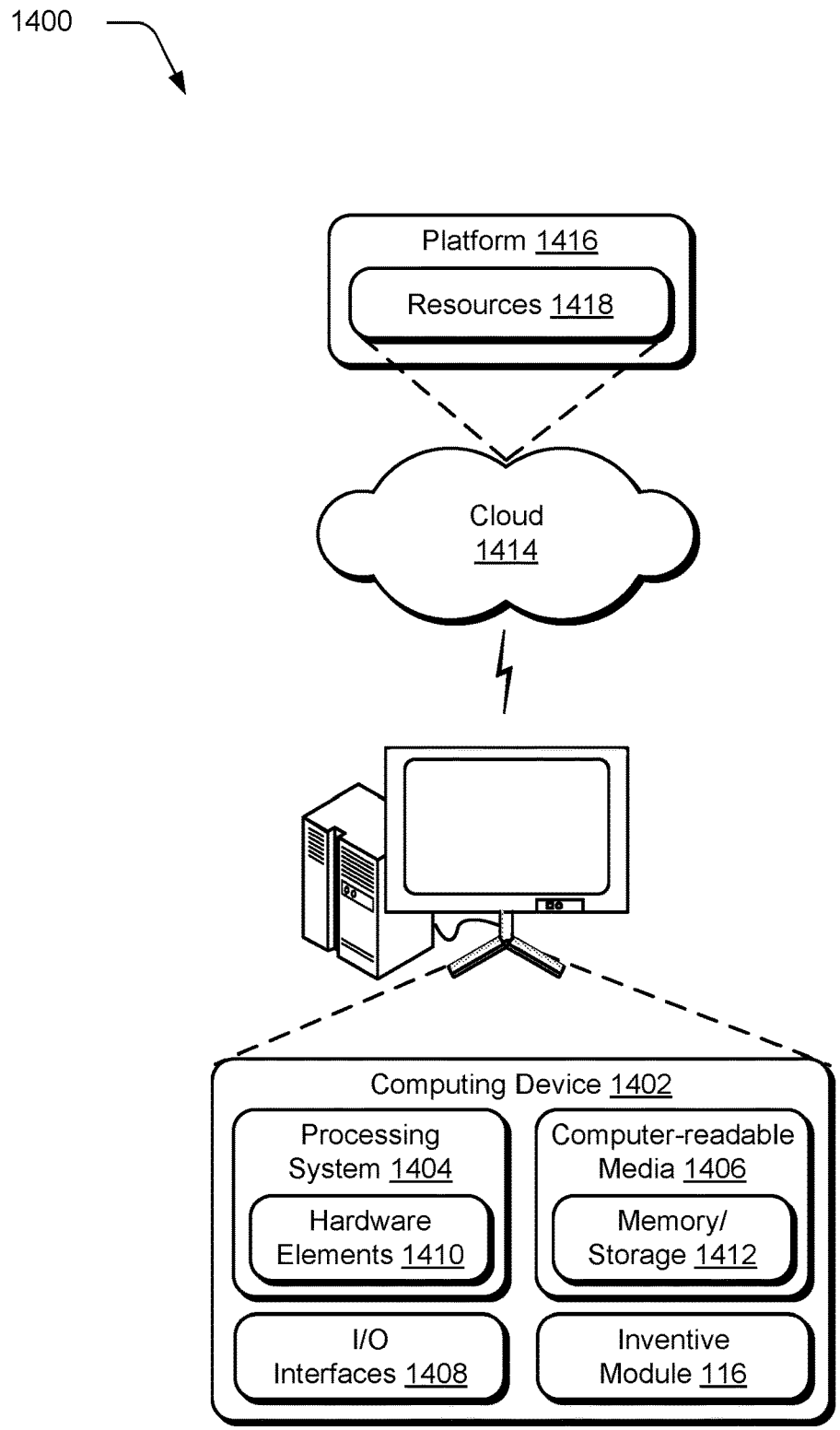
FIG. 14 illustrates an example system including various components of an example device that can be implemented as any type of computing device as described and/or utilize with reference to FIGS. 1-13 to implement embodiments of the techniques described herein.

FIG. 14 illustrates an example system generally at 1400 that includes an example computing device 1402 that is representative of one or more computing systems and/or devices that implement the various techniques described herein. This is illustrated through inclusion of the control management system 166. The computing device 1402 is configurable, for example, as a server of a service provider, a device associated with a client (e.g., a client device), an on-chip system, and/or any other suitable computing device or computing system.

The example computing device 1402 as illustrated includes a processing system 1404, one or more computer-readable media 1406, and one or more I/O interface 1408 that are communicatively coupled, one to another. Although not shown, the computing device 1402 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1404 is representative of functionality to perform one or more operations using hardware. Accordingly, the processing system 1404 is illustrated as including hardware element 1410 that is configurable as processors, functional blocks, and so forth. This includes implementation in hardware as an application specific integrated circuit or other logic device formed using one or more semiconductors. The hardware elements 1410 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1406 is illustrated as including memory/storage 1412. The memory/storage 1412 represents memory/storage capacity associated with one or more computer-readable media. The memory/storage 1412 includes volatile media (such as random access memory (RAM)) and/or nonvolatile media (such as read only memory (ROM), Flash memory, optical disks, magnetic disks, and so forth). The memory/storage 1412 includes fixed media (e.g., RAM, ROM, a fixed hard drive, and so on) as well as removable media (e.g., Flash memory, a removable hard drive, an optical disc, and so forth). The computer-readable media 1406 is configurable in a variety of other ways as further described below.

Input/output interface(s) 1408 are representative of functionality to allow a user to enter commands and information to computing device 1402, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1402 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1402. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1402, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1410 and computer-readable media 1406 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1410. The computing device 1402 is configured to implement particular instructions and/or functions corresponding to the software and/or hardware modules. Accordingly, implementation of a module that is executable by the computing device 1402 as software is achieved at least partially in hardware, e.g., through use of computer-readable storage media and/or hardware elements 1410 of the processing system 1404. The instructions and/or functions are executable/operable by one or more articles of manufacture (for example, one or more computing devices 1402 and/or processing systems 1404) to implement techniques, modules, and examples described herein.

The techniques described herein are supported by various configurations of the computing device 1402 and are not limited to the specific examples of the techniques described herein. This functionality is also implementable all or in part through use of a distributed system, such as over a "cloud" 1414 via a platform 1416 as described below.

The cloud 1414 includes and/or is representative of a platform 1416 for resources 1418. The platform 1416 abstracts underlying functionality of hardware (e.g., servers) and software resources of the cloud 1414. The resources 1418 include applications and/or data that can be utilized while computer processing is executed on servers that are remote from the computing device 1402. Resources 1418 can also include services provided over the Internet and/or through a subscriber network, such as a cellular or Wi-Fi network.

The platform 1416 abstracts resources and functions to connect the computing device 1402 with other computing devices. The platform 1416 also serves to abstract scaling of resources to provide a corresponding level of scale to encountered demand for the resources 1418 that are implemented via the platform 1416. Accordingly, in an interconnected device embodiment, implementation of functionality described herein is distributable throughout the system 1400. For example, the functionality is implementable in part on the computing device 1402 as well as via the platform 1416 that abstracts the functionality of the cloud 1414.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
receiving, by a service provider computing device, an input identifying a nonfungible token (NFT) associated with a physical item involved in a transaction;
locating, by the service provider computing device, a blockchain account associated with the NFT by querying a blockchain;
locating, by the service provider computing device, a service provider account of a service provider system based on the located blockchain account, the service provider account involved in the transaction;
generating, by the service provider computing device, digital content based at least in part on data obtained from the service provider account;
transmitting, by the service provider computing device for receipt by a client computing device, a subset of the digital content to be displayed in a user interface of the client computing device;
receiving, by the service provider computing device, a request to access the digital content from the client computing device responsive to display of the subset of digital content in the user interface at the client computing device;
transmitting, by the service provider computing device, a request to verify possession of the physical item responsive to the request to access the digital content;
obtaining, by the service provider computing device, at least one three-dimensional physical characteristic of the physical item from the client computing device, the at least one three-dimensional physical characteristic generated using a physical item scanner by the client computing device;
determining, by the service provider computing device, that the request to access the digital content is associated with possession of the NFT by verifying that the at least one three-dimensional physical characteristic of the physical item corresponds to a fingerprint of the NFT, the NFT including the fingerprint generated as describing the at least one three-dimensional physical characteristic of the physical item;
generating, by the service provider computing device, digital content for the service provider account responsive to the verifying; and
communicating, by the service provider computing device for receipt by the client computing device and display in the user interface at the client computing device, the digital content generated responsive to the verifying, the communicating performed responsive to the determining the request is associated with possession of the NFT.

2. The method as described in claim 1, wherein the determining the request is associated with the NFT includes verifying possession of the NFT.

3. The method as described in claim 2, wherein the verifying further comprises receiving a key associated with the blockchain account.

4. The method as described in claim 1, wherein the transaction at least in part is performed by:
initiating, by the computing device, transfer of the NFT on the blockchain to the blockchain account;
transmitting, by the computing device, data to the blockchain about the NFT; and
receiving, by the computing device, indication that the NFT is in the blockchain account.

5. The method as described in claim 1, wherein the determining whether the request is associated with possession of the NFT is performed responsive to detecting that a threshold amount of time has passed.

6. The method as described in claim 1, wherein the communicating includes transmitting the digital content to a network address associated with the service provider account.

7. The method as described in claim 1, wherein the locating the blockchain account includes obtaining a transaction history and associated blockchain accounts of one or more transactions involving the NFT.

8. The method as described in claim 1, wherein the digital content includes a transaction fee adjustment for a subsequent transaction by the service provider account.

9. The method as described in claim 1, wherein the digital content includes at least one of a market value determination of the NFT, a second NFT, a priority display location for a listing by the service provider account, or a discounted price for an asset.

10. A service provider computing device comprising:
a processing device; and
a computer-readable storage medium storing instructions that, responsive to execution by the processing device, causes the processing device to perform operations including:
receiving an input identifying a nonfungible token (NFT) associated with a physical item involved in a transaction;
locating a blockchain account associated with the NFT by querying a blockchain;
locating a service provider account of a service provider system based on the located blockchain account, the service provider account involved in the transaction;
generating digital content based at least in part on data obtained from the service provider account;
transmitting, for receipt by a client computing device, a subset of the digital content to be displayed in a user interface of the client computing device;
receiving a request to access the digital content from the client computing device responsive to display of the subset of digital content in the user interface at the client computing device;
transmitting, for receipt by the client computing device, a request to verify possession of the physical item responsive to the request to access the digital content;
obtaining at least one three-dimensional physical characteristic of the physical item from the client computing device, the at least one three-dimensional physical characteristic generated using a physical item scanner by the client computing device;

determining that the request to access the digital content is associated with possession of the NFT by verifying that the at least one three-dimensional physical characteristic of the physical item corresponds to a fingerprint of the NFT, the NFT including the fingerprint generated as describing the at least one three-dimensional physical characteristics of the physical item;

generating digital content for the service provider account responsive to the verifying; and communicating, for receipt by the client computing device and display in the user interface at the client computing device, the digital content generated responsive to the verifying, the communicating performed responsive to the determining the request is associated with possession of the NFT.

11. The service provider computing device as described in claim 10, wherein the determining the request is associated with the NFT includes verifying possession of the NFT.

12. The service provider computing device as described in claim 11, wherein the verifying further comprises receiving a key associated with the blockchain account.

13. The service provider computing device as described in claim 10, wherein the transaction at least in part is performed by:

initiating, by the computing device, transfer of the NFT on the blockchain to the blockchain account;

transmitting, by the computing device, data to the blockchain about the NFT; and receiving, by the computing device, indication that the NFT is in the blockchain account.

14. The service provider computing device as described in claim 10, wherein the determining whether the request is associated with possession of the NFT is performed responsive to detecting that a threshold amount of time has passed.

15. The service provider computing device as described in claim 10, wherein the communicating includes transmitting the digital content to a network address associated with the service provider account.

16. The service provider computing device as described in claim 10, wherein the locating the blockchain account includes obtaining a transaction history and associated blockchain accounts of one or more transactions involving the NFT.

17. The service provider computing device as described in claim 10, wherein the digital content includes a transaction fee adjustment for a subsequent transaction by the service provider account.

* * * * *